(12) United States Patent
Galanes et al.

(10) Patent No.: US 7,805,704 B2
(45) Date of Patent: Sep. 28, 2010

(54) DEVELOPMENT FRAMEWORK FOR MIXING SEMANTICS-DRIVEN AND STATE-DRIVEN DIALOG

(75) Inventors: Francisco M. Galanes, Newton, MA (US); Richard Henry Irving, Redmond, WA (US); Renaud Julien Lecoeuche, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1368 days.

(21) Appl. No.: 11/074,890

(22) Filed: Mar. 8, 2005

(65) Prior Publication Data

US 2006/0206826 A1  Sep. 14, 2006

(51) Int. Cl.
*G06F 9/44* (2006.01)
*G06F 17/27* (2006.01)
*G10L 21/00* (2006.01)

(52) U.S. Cl. ............................. 717/107; 704/9; 704/275
(58) Field of Classification Search ......... 717/100–104, 717/129; 715/700–970; 379/88
See application file for complete search history.

(56) References Cited

U.S. PATENT DOCUMENTS 6,330,539 B1 * 12/2001 Takayama et al. .......... 704/275
7,039,166 B1 * 5/2006 Peterson et al. .......... 379/88.18
2005/0010892 A1 * 1/2005 McNair et al. ............. 717/101

FOREIGN PATENT DOCUMENTS

| EP | 1187007 | 3/2002 |
| EP | 1 701 256 A2 | 9/2006 |

OTHER PUBLICATIONS

Examination Report.
Second Chinese Office Action.
First Office Action in China.
Best Available Translation for Russian Office Action Serial No. 2006106562.
Russian Office Action Serial No. 2006106562, dated Mar. 23, 2010.
EP Communication and European Search Report dated Dec. 3, 2007 for EP Application No. 06 110 665.4.

* cited by examiner

*Primary Examiner*—Wei Y Zhen
*Assistant Examiner*—Chung Cheng
(74) *Attorney, Agent, or Firm*—Westman, Champlin & Kelly, P.A.

(57) ABSTRACT

An application program interface embodied on one or more computer readable media is disclosed. The interface includes a first dialog container configured to facilitate development of a first type of dialog within an application. Also included is a second dialog container configured to facilitate development of a second type of dialog within the application.

18 Claims, 3 Drawing Sheets

DEVELOPMENT FRAMEWORK FOR MIXING SEMANTICS-DRIVEN AND STATE-DRIVEN DIALOG

BACKGROUND OF THE INVENTION

The present invention generally pertains to a development framework that enables a developer to efficiently mix different types of dialog within a given application. More particularly, the present invention pertains to the development of applications that incorporate both semantics-driven and state-driven dialog.

Applications that support user interaction through a voice user interface (VUI) are well known in the art. During the development process, these types of applications can be authored on top of a low level application program interface (API) framework that provides access to basic resources. For example, it is known for a telephony application to be authored on top of a low level API framework that includes support for resources such as, but not necessarily limited to, a telephony infrastructure, speech recognition resources, and speech synthesis resources.

From the perspective of an application developer, it is common that the process of authoring code that directly targets the described low level API resources is relatively tedious and labor intensive. Higher level constructs are known to provide a more intuitive interface to the low level resources. In some cases, higher level constructs have been utilized as a basis for creation of a dialog authoring model in the form of an API framework that serves as an interface to the low level API resources, thereby enabling a simplification of the generation of application code. The objects included in the higher level API framework have been configured to support a variety of different development experiences.

The result of the development process is generation of an application that facilitates user-system dialog in one of several different possible formats. Some dialog will be system-driven (or system-initiative) dialog. In one example of this type of dialog, a user interfacing a telephony application is presented with a spoken statement in the form of "welcome to my support application, please enter your product identification number." In this case, no action is generally taken until the requested task is complete (i.e., a valid product identification number is entered). The system requires particular information, sometimes in a particular format. Thus, system-driven dialog is generally very constrained.

Some dialog will be user-driven (or user-initiative) dialog. In one example of this type of dialog, a user interfacing through a telephony application is presented with a spoken statement in the form of "welcome to my support application, how may I help you?" In response to this type of statement, the user can generally say anything, such as "I am having trouble with my machine" or "I want to return a product." The system is then configured to identify the nature of the user's inquiry and respond accordingly, for example, "do you have a receipt?" The system determines what the key pieces of information are within the user's inquiry and then responds accordingly.

A development framework that supports semantics-driven dialog is generally more user-driven than system-driven. When authoring a section of semantics-driven dialog, a developer will generally specify which of a plurality of fields are to be filled in by obtaining appropriate information from the system user. In some ways, the semantics-driven format is similar to a form in a Graphical User Interface (GUI) application having certain fields to be filled in by the user. Instead of specifying a predetermined path through the fields (A→B→C, etc.), certain dialog nodes or elements are specified to react depending on the particular state of other fields. For example, a given dialog node A is specified to be active if field C is empty. Multiple dependencies are also possible, for example, a given dialog node is specified as active if fields A, B and C are empty but field E is filled and confirmed. Some fields can be set to require confirmation with the system user that their content is accurate. Following every user-machine interaction, a determination is made within the semantics-driven dialog framework as to which dialog node or nodes should be active next.

A development framework that supports state-driven dialog is generally more system-driven than user-driven. Interaction flow within a state-driven dialog process is more predetermined than with semantics-driven dialog interactions. Decisions generally follow a predetermined path from one element to the next. For example, a request is made for a first particular item of information. In response, information is received from the user. An evaluation is made as to whether the received information is worthy of confidence. If not, a confirmation process is carried out. If so, then the system requests a predetermined second item of information.

In state-driven dialog, there generally is no way for a user to advance more information than what is presently being asked for by the system. At every step, the system generally decides what is going to be done next. It is common for developers to graphically represent state-driven dialog in the form of a flow chart. Unlike semantics-driven dialog, the dialog does not jump around depending on what the user provides as input.

The higher level API framework described above as providing an interface to the low level API resources can be configured to primarily support semantics-driven dialog. This enables a developer to author very flexible and natural dialogs. A disadvantage with such a configuration is that simple, system-driven dialog authoring becomes a relatively difficult undertaking.

The higher level API can alternatively be configured to primarily support state-driven dialog. It now becomes easy to link dialog states with a condition (e.g., once you are finished with state A, you evaluate which condition is true and follow that path to the next state). This type of dialog development is easy to visualize and author. A disadvantage; however, is that the resulting dialog is neither natural nor flexible for the user of the application.

SUMMARY OF THE INVENTION

Embodiments of the present invention pertain to an application program interface embodied on one or more computer readable media. The interface includes a first dialog container configured to facilitate development of a first type of dialog within an application. Also included is a second dialog container configured to facilitate development of a second type of dialog within the application.

DETAILED DESCRIPTION OF ILLUSTRATIVE EMBODIMENTS

I. Exemplary Environments

Prior to discussing embodiments of the present invention in detail, exemplary computing environments within which the embodiments and their associated systems can be implemented will be described.

Figure 1:
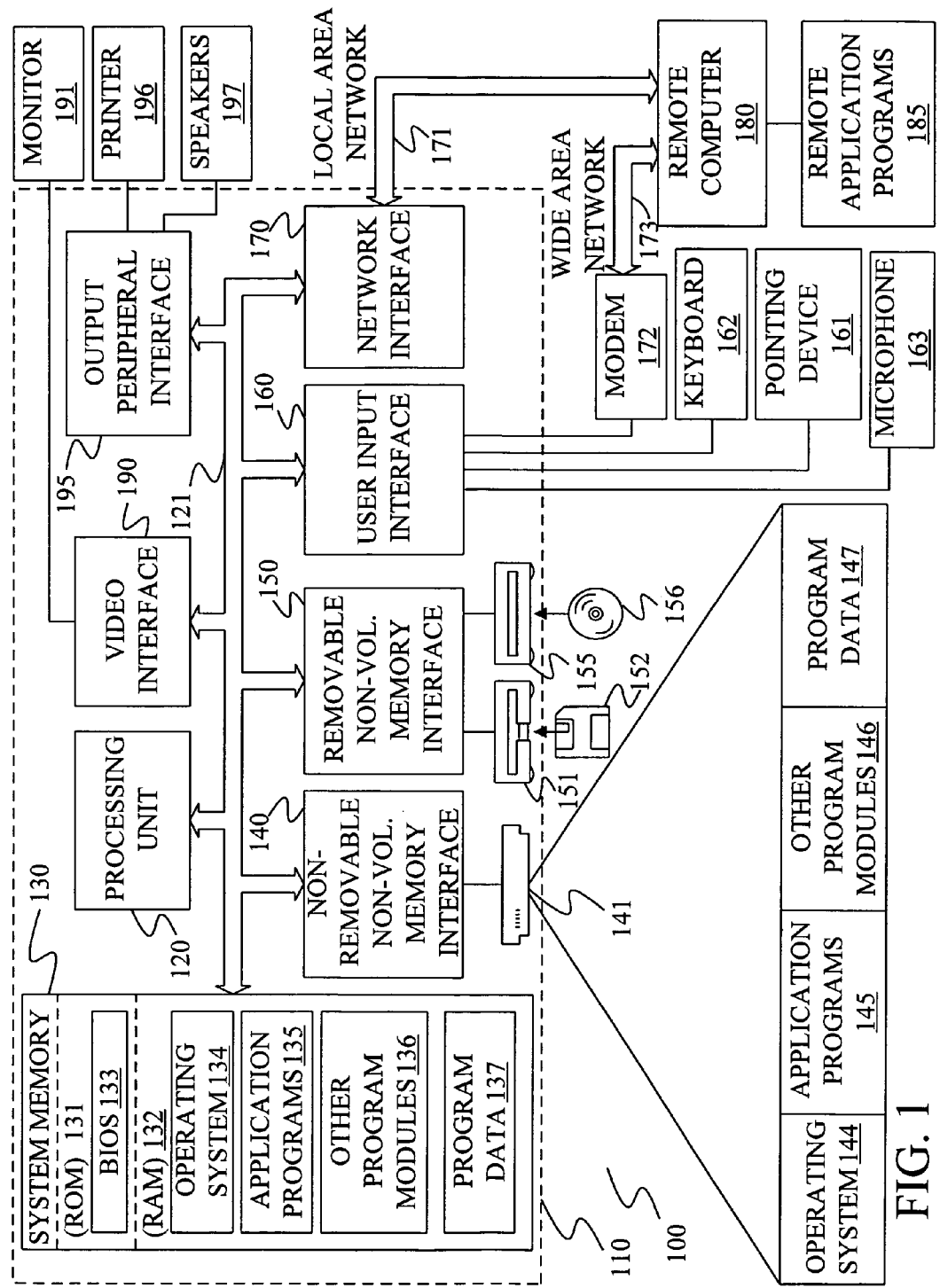
FIG. 1 is a block diagram of one illustrative environment in which the present invention may be practiced.

FIG. 1 illustrates an example of a suitable computing environment 100 within which embodiments of the present invention and their associated systems may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of illustrated components.

The present invention is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention is designed to be practiced in distributed computing environments where tasks are performed by remote processing devices that are linked through a communications network. In a distributed computing environment, program modules are located in both local and remote computer storage media including memory storage devices. Tasks performed by the programs and modules are described below and with the aid of figures. Those skilled in the art can implement the description and figures as processor executable instructions, which can be written on any form of a computer readable media.

With reference to FIG. 1, an exemplary system for implementing the invention includes a general-purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that the present invention can be carried out on a computer system such as that described with respect to FIG. 1. However, the present invention can be carried out on a server, a computer devoted to message handling, or on a distributed system in which different portions of the present invention are carried out on different parts of the distributed computing system.

II. Exemplary System Environments

For the purpose of illustration, embodiments of the present invention will be described in the context of a telephony application. The scope of the present invention, however, is not so narrow and embodiments can be applied in the context of any speech-oriented application.

A telephony application can be seen as a multi-tier system including a presentation layer and a logic+data layer. The presentation layer is typically responsible for interacting with the final user using speech output and speech input. Some systems will incorporate additional output means such as a GUI, or additional input means such as a Dual Tone Multi-Frequency (DTMF) input mechanism. In general, the presentation layer provides a Voice User Interface. The logic+data layer is typically responsible for the underlying business rules and data access and storage. It is known to provide a set of API's as an interface to the logic+data layer but there is still a need for a flexible API framework for authoring VUI.

Figure 2:
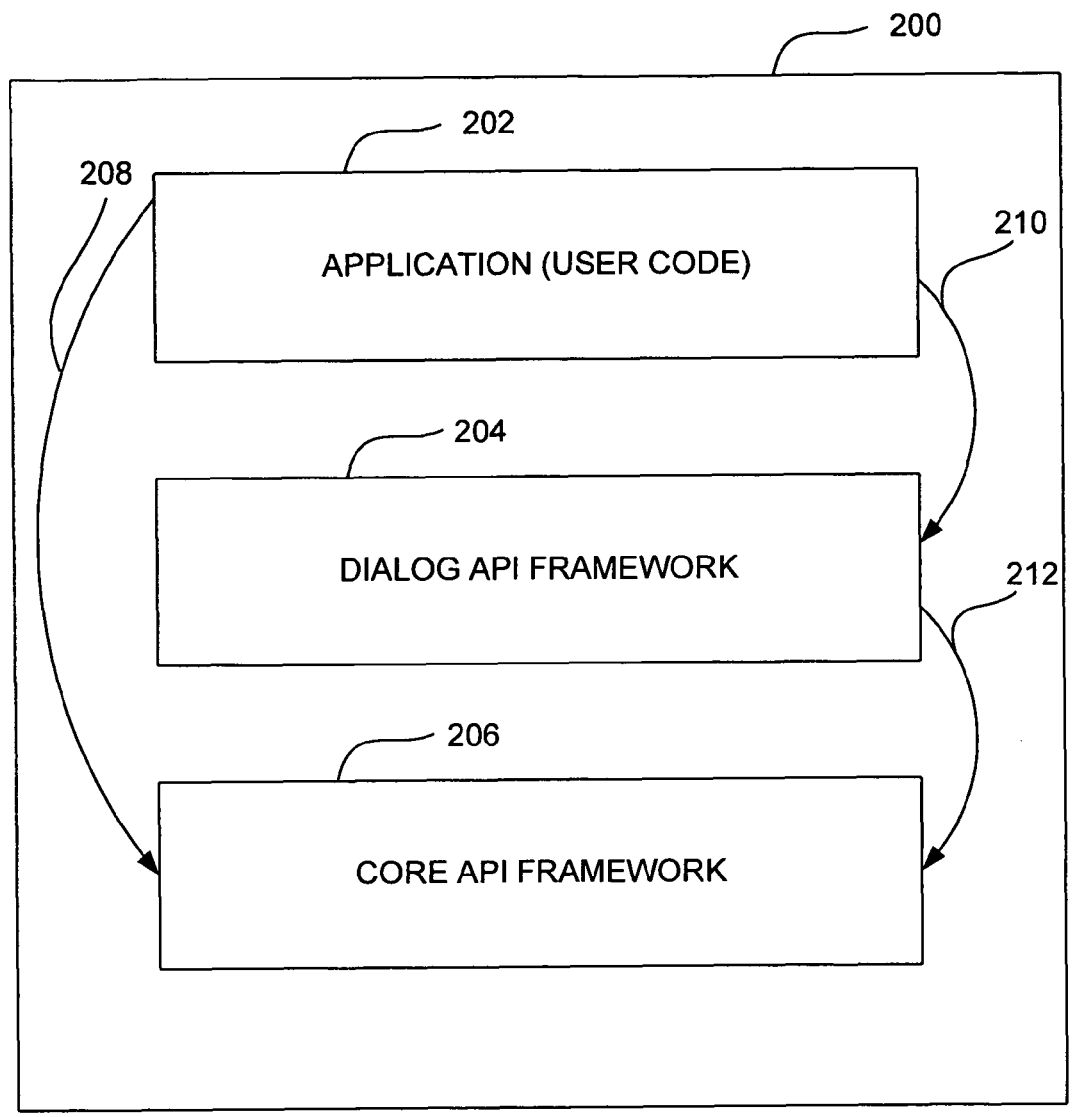
FIG. 2 is a schematic block diagram illustrating high level characteristics of a system architecture.

FIG. 2 is a schematic block diagram illustrating high level characteristics of a system architecture 200. The highest level of architecture 200 includes application or user code 202. This is illustratively the code created by a developer to effectuate dialog. The lowest level of architecture 200 includes core API framework 206. The core framework 206 illustratively provides access to system resources. For example, the core framework illustratively includes a telephony API, a signaling API, a DTMF API, a speech recognition API, a speech synthesis API, and/or any other system resource interface.

As is indicated by arrow 208, code 202 can be configured to directly call upon components of core framework 206. This method of development can be relatively tedious and labor intensive from the perspective of the developer. To ease the development burden, a dialog API framework 204 is positioned between the application 202 and core framework 206. Framework 204 provides a higher level API approach than framework 206. Thus, in accordance with arrows 210 and 212, user code 202 can be written to direct calls to framework 204, which then makes corresponding calls to the components of framework 206. In this way, the developer can author dialog in a more productive manner. In accordance with one embodiment, a tool (not illustrated) is built on top of the dialog API framework 204 to enable further improvements of the developer's productivity. The tool facilitates and enhances the developer's ability to author against the higher level API framework.

Thus, architecture 200 provides a VUI development environment having two layers: a low level speech layer sufficient for authoring various telephony scenarios; and a higher level dialog layer configured to improve developer productivity by creating higher level abstractions.

III. The Dialog API Framework

With further reference to FIG. 2, the dialog API framework 204 can be configured to support any of a variety of types of dialog. For example, framework 204 can be configured to facilitate the creation of an application 202 that primarily incorporates semantics-driven dialog. Alternatively, framework 204 can be configured to facilitate creation of an application 202 that primarily incorporates state-driven dialog. Known attempts at providing a higher level development interface; however, have generally failed to support efficient creation of an application that incorporates both semantics-driven and state-driven dialog. In accordance with one aspect of the present invention, dialog API framework 204 (and optionally one or more related development tools) is configured to facilitate the efficient development of an application 202 that mixes semantics-driven and state-driven dialog. It should be noted that the same schemes for mixing semantics- and state-driven dialog development could be utilized to enable mixed development of any combination of dialog types without departing from the scope of the present invention.

Figure 3:
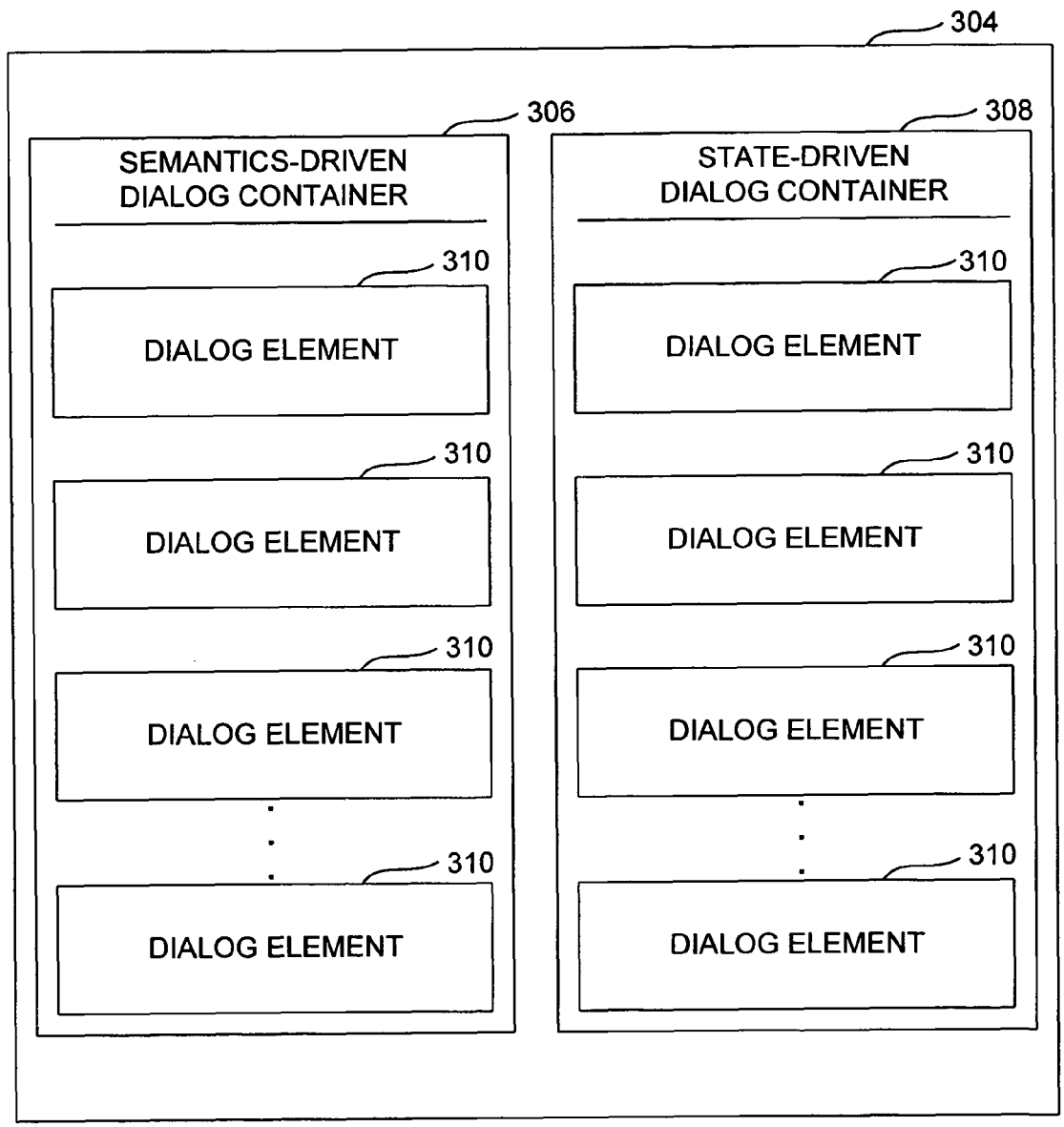
FIG. 3 is a schematic block diagram of a portion of an API framework.

FIG. 3, in accordance with one aspect of the present invention, is a schematic block diagram of a portion 304 of a dialog API framework (e.g., framework 204 in FIG. 2). In support of a mixed dialog-type authoring system, the illustrated framework 304 includes a semantics-driven dialog container 306 and a state-driven dialog container 308. While only one of each type of container is illustrated, multiple of either can be included depending on a particular development scheme. The functional relationship among multiple dialog containers and their contents will become apparent as the present description continues.

Dialog containers 306 and 308 each include a plurality of dialog elements 310. While the same reference numeral has been utilized to designate all of the illustrated dialog elements, it is to be understood that the nature of the dialog elements may vary from one to the next. In accordance with one embodiment, each dialog container is configured to control activation of its contained dialog elements. Container 306 is configured to accommodate and effectuate semantics-driven dialog, while container 308 is configured to accommodate and effectuate state-driven dialog.

In accordance with one embodiment, any dialog container is configured to also accept the role of a dialog element. For example, a dialog container can illustratively operate as a dialog element within another dialog container. In other words, a dialog container can effectively contain a dialog container. Such an arrangement provides development flexibility. In accordance with one aspect of the present invention, the described framework enables an entire application to be designed to be semantics-driven, state-driven, or mixed depending on the preferences of the developer. It is generally at the developer's discretion as to how to organize and connect dialog elements, with a dialog container being one particular variety of available dialog elements. As will be described below, a broad range of dialog elements in the form of specialized API's are available to the developer to provide corresponding varying range of specialized functions.

In accordance with one aspect of the present invention, at the level of the higher API (i.e., at the level of framework 204 in FIG. 2), there is support for individual dialog elements, semantics-driven dialog, and an infrastructure to support all types of dialog. In one embodiment, the API level also includes support for state-driven dialog. In another embodiment, however, explicit support for state-driven dialog is incorporated into a tool component that is built on top of the API framework to facilitate development. It should be noted that it is within the scope of the present invention to manipulate boundaries between tool and API to enable any of a variety of different specific implementations. All such configurations are within the scope of the present invention.

Another advantage associated with the described development framework is that dialog elements are generally designed to operate within either a semantics- or state-driven dialog container or independently. Prior to turning to a detailed description of different types of dialog elements, an example will now be provided of what it is like to develop an application that mixes semantics-driven and state-driven dialog.

In accordance with one example of mixed-format dialog development, a developer begins with a blank canvass and then adds three nodes that represent consecutive dialog components to be executed in order. The developer drills down on the first node and inserts a statement such as "welcome." A statement is a simple dialog component that does not require the complex capabilities of semantics-driven dialog. One option for the first node is to create a state-driven container and place a statement element therein. In one embodiment, the development platform is configured to accommodate the establishment of a statement without creating either type of container.

The second node is illustratively intended to facilitate the process of gathering user information. The developer has several options depending on the nature of the information to be gathered. The developer could create a state-driven container having elements that facilitate a state-driven information collection process (e.g., "what is your product ID number" . . . "when was this item purchased" . . . etc.). Alternatively, the developer can create a semantics-driven container having elements that facilitate a semantics-driven information collection process (e.g., "Please identify yourself" . . . "But what is your last name" . . . "Okay, what would you like to do today" . . . etc.).

The designer has similar options in choosing how to design the third node, which is illustratively a node that enables the user to choose a function to perform. For example, the user could be presented with a state-driven scenario such as a menu of options from which to choose. Alternatively, the decision could be made utilizing a semantics-driven method where the user speaks his or her selection and the system responds accordingly.

In accordance with one aspect of the present invention, the dialog API framework includes a plurality of API objects in the form of dialog elements that are made available for exploitation by an application developer. As has been described, a dialog container is one type of dialog element and is configured to facilitate development and execution of a particular type of dialog.

In accordance with another embodiment, a Statement element is another type of dialog element provided within the framework. A Statement element can illustratively be placed by a developer into any type of container or can be functional outside of a container. A Statement element enables a statement to be made with no expectation of an answer back from the user. Examples include a welcome prompt, a goodbye prompt, or a "sorry there was an error" prompt.

In accordance with another embodiment, a QuestionAnswer element is another type of dialog element provided within the framework. A QuestionAnswer element is illustratively operable from within either type of container. The general function of a QuestionAnswer element is to attempt to get a response from the user. In one embodiment, this element is configured to inquire again if an exchange is unsuccessful (e.g., "sorry, I did not hear you, please repeat again"). In another embodiment, a QuestionAnswer element is equipped to deal with misrecognition (e.g., "sorry, I didn't understand that, please repeat it again"). The element can be configured to provide some guidance to a user if misrecognition does occur (e.g., "sorry, I am expecting a number between one and ten").

In one embodiment, a QuestionAnswer element is configured to facilitate post-processing following speech recognition. For example, when the QuestionAnswer element is employed within a semantics-driven context (e.g., from within a semantics-driven container), it facilitates the process of extracting key information from a user response and filling in fields as necessary. In one embodiment, the post-processing functionality of a QuestionAnswer element is not optional when the element is employed in a semantics-driven context. In contrast, post-processing can be optional in a state-driven context.

In one embodiment, properties can be set within the QuestionAnswer element in order to support a post-processing functionality (e.g., if fields A, B and C are filled in, then X post-process will happen, etc.). In order for a QuestionAnswer element to be embedded within a semantics-driven dialog context, some property values must be supplied in support of post-processing functionality. In one embodiment, when a QuestionAnswer element is embedded within a state-driven dialog context, post-processing can be leveraged if the developer so chooses but it is not necessarily required.

For example, imagine a scenario wherein the user says "exit" and the system responds "are you sure you want to hang up". After the user responds "yes" or "no", the response probably does not need to be stored for any subsequent purpose. Thus, it is generally unnecessary to set a corresponding property and designate corresponding post-processing steps under the circumstances. Instead, the developer can embed a QuestionAnswer element within a state-driven context, and configure the element to, after recognition is complete, capture user input and respond accordingly. It is within the capacity of a QuestionAnswer element to facilitate such state-driven interactions. But even in a state-driven dialog context, it may be useful to capture input for subsequent dialog purposes. In one embodiment, in such a case, the system is configured to leverage post-processing to fill in a field directly.

In accordance with one embodiment, a QuestionAnswer element is configured to play a MainPropmpt when started, to listen for speech and or DTMF, to support more than one speech or DTMF grammar, to listen or not listen while playing a prompt, to start listening after a portion of a prompt has been played to behave like a standard DialogElement (described later herein), to keep prompting until a valid recognition has been detected, to adapt the prompt to deal with Help and Repeat commands, to adapt the prompt to deal with silence or non-recognition, to support a FormFillingDialog, to expose a mechanism for binding results to SemanticItems, to automate confirmation of a SemanticItem, and/or to determine FormFillingDialog activation by looking at semantic bindings.

In accordance with another embodiment, a SemanticItem element is another type of dialog element provided within the framework. A SemanticItem element provides a class that supports form fields, generally in the semantics-driven context. These form fields are the fields that are filled in during the semantics-driven dialog process.

In accordance with another embodiment, a FormFillingDialog element is another type of dialog element provided within the framework. A FormFillingDialog element is a container that drives semantic-driven dialog and supports the associated process of filling in fields.

In accordance with another embodiment, a RecordSound element is another type of dialog element provided within the framework. A RecordSound element is illustratively operable from within either type of container or independently. The general function of a RecordSound element is to obtain a recording from the user (e.g., without performance of any recognition function). Such an element is useful in the context of voicemail and other similar applications.

In accordance with another embodiment, a Command element is another type of dialog element provided within the framework. A Command element is illustratively operable from within either type of container or independently. The general function of a Command element is to support a capture of user input that generally has nothing to do with the main flow of the application. For example, the Command element could be implemented to enable a user to say a command such as "operator" as a way out of the main dialog. In one embodiment, the command can be non-verbal such as the pressing of a key (e.g., pressing the "0" key). In one embodiment, a Command element is authored at a top level of a dialog application such that it applies universally (e.g., if "operator" is recognized at any time during a dialog, then transfer to extension 0). In another embodiment, a Command element can be authored to be active in context or active by scope. The element can illustratively be active on a global scope or a constrained scope (e.g., active only within a particular container). Thus, a scope can illustratively be as small as a particular dialog element or as large as an entire application. Accordingly, a Command element is generally activated not by dialog flow but by scope or dialog region.

In accordance with another embodiment, an Application element is another type of dialog element provided within the framework. An Application element works as a top level context for a specific dialog application. It typically instantiates the top level container. The general function of an Application element is to establish guidelines for interactions generally as well as lower level interactions that occur between elements within the framework. While the duties of the Application element may vary over a broad range, they can include the implementation of basic steps for supporting different aspects of a telephony application including automatic phone answering, call rejecting, call termination, tracking call progress, specifically supporting certain inbound and outbound call features, and handling connection errors.

It is to be understood that there are additional helper objects within the framework that assist in the implementation of other dialog functions. Most elements are operable from within either type of container or independently. Several elements are configured to deal with exceptions like silence, misrecognition, unrecognizable responses (e.g., response in unrecognized language), wrong answers and the like. Such elements are used to establish what dialog will be executed depending on the nature of a particular exception.

In one embodiment, the system is configured to support prompt selection automatically (i.e., utilizing a PromptSelection element) so long as corresponding texts are predetermined. Elements such as a HistoryItem element are utilized to determine what is happening during run-time. Similarly, a Logging element provides assistance in tracking what is going on during run-time (e.g., the API provides data to an established logging structure). A HistoryItem element can be used to facilitate implementation of a Bail-Out element as an appropriate response to unusual circumstances such as when a user disappears (e.g., question asked four times with no response but silence or unrecognizable responses).

In accordance with one unique aspect of the present invention, the dialog API approach is implemented at a container level. The described and other children elements support logic embedded within the dialog containers such that the containers are able to delegate functions to the children elements. As has been mentioned, a dialog element within a dialog container can even effectively be another dialog container. Regardless of the contents of a given container, it is configured to support a particular type of dialog type such as, but not limited to, semantics-driven or state-driven dialog.

The container is supplied with the information necessary to activate its dialog elements in proper sequence. The sequence is at least partially determined by the particular container's nature in terms of whether it is configured to apply a predetermined strategy, such as semantics-driven dialog, state-driven dialog, or a different strategy. In one embodiment of the present invention, a new dialog container can be created to implement any dialog strategy to its children dialog elements.

In accordance with one embodiment, the described dialog API framework is configured to support the creation of tools that support some level of coding automation. The API/tool pair illustratively enhances a developer's productivity, especially as compared to coding directly to low level resources.

In accordance with one aspect of the present invention, a dialog application developed in accordance with the described dialog API framework can be seen as a tree where the top node is the application itself. The application is built upon a series of components and the application manages the flow between them. These components, in turn can be built upon other components. At the leaf nodes in the tree are found the smallest, most basic dialog components. The described structure efficiently supports sub-dialog reuse and creation of prepackaged applications and components.

Each component manages the "flow" between its children components. Flow can be relatively dynamic (as in a semantically driven or goal-driven dialog) or relatively procedural in nature. In any case, activating a component illustratively involves causing the component to try to "do its job" and report back to the caller (the parent) when either it is done or some error has occurred. A component that has other children then will, upon activation, find the first child to activate, and wait until it is done, decide which one to run next, etc.

Some dialog scenarios can't be authored completely by "flow," but directly call for a context change. These interactions can be better viewed as an interruption of the flow and a jump to a different task in the application. In one embodiment, these interruptions are triggered by the user uttering a specific command. The recognition of that command then causes the context change and the execution of the new task.

As has been described, the dialog API framework illustratively supports two main types of objects, namely, DialogElements and DialogContainers. The main application is illustratively a DialogContainer; wherein new DialogContainers are defined by derivation, with a new class being defined per new container. These containers are then instantiated at runtime and executed. Sub-dialogs in this model can be viewed as component reuse (instead of subroutine calls).

In one embodiment, DialogContainers do not technically contain other DialogContainers directly, but they do "invoke" other dialog containers. This is illustratively accomplished through use of a DialogReference primitive or element. DialogReference illustratively exposes properties that can refer to any DialogContainer, so it can be instantiated at runtime. When the referenced DialogContainer completes its execution, it illustratively notifies the DialogReference that instantiated it. The parent DialogContainer can then resume flow as usual.

In one embodiment, DialogElements are configured to expose a method to start execution, to expose a method to stop/cancel execution, to execute asynchronously, to notify the application when they are not running anymore, to notify the application of the reason why they are not running (completed, cancelled, error, etc.), to notify the application when they are started, and to have access to the Application object (and therefor to associated signaling and unified API's). DialogElements are illustratively composable, and when composed will have access to its parent.

In accordance with one aspect of the present invention any authoring environment can be provided to expose the functionality of the described dialog API framework. Such an authoring environment could be API only, API+tool, tool only, or any other implementation without departing from the scope of the present invention.

Although the present invention has been described with reference to particular embodiments, workers skilled in the art will recognize that changes may be made in form and detail without departing from the spirit and scope of the invention.

What is claimed is:

1. A computer-implemented voice user interface system, comprising:

an application program interface that supports configuration of a voice user interface that mixes different types of audible dialog prompts, and wherein the application program interface comprises:

a first dialog container that includes information for activating, in a predetermined sequence, audible dialog prompts that correspond to a collection of audible dialog elements assigned to the first dialog container, the predetermined sequence being at least partially determined by semantics-driven audible dialog functionality applied by the first dialog container to said collection of audible dialog elements assigned to the first dialog container;

a second dialog container that includes information for activating, in a predetermined order, audible dialog prompts that correspond to a collection of audible dialog elements assigned to the second dialog container, the predetermined order being at least partially determined by state-driven audible dialog functionality applied by the second dialog container to said collection of audible dialog elements assigned to the second dialog container;

a particular audible dialog element that corresponds to a particular audible dialog prompt, wherein the particular audible dialog element having different property setting requirements depending upon whether included in the collection of audible dialog elements assigned to the first dialog container or the set of audible dialog elements assigned to the second dialog container; and a computer processor that is a component of a computing device, wherein the computer processor processes an implementation of the application program interface and provides a corresponding implementation of the voice user interface by outputting, to a user of the voice user interface system, said audible dialog prompts that correspond to the collection of audible dialog elements assigned to the first dialog container and said audible dialog prompts that correspond to the collection of audible dialog elements assigned to the second dialog container.

2. The system of claim 1, wherein providing the corresponding implementation of the voice user interface further comprises outputting, to the user of the voice user interface system, both semantics-driven and state-driven audible dialog prompts.

3. The system of claim 1 further comprising a core application program interface framework that serves as an interface to low-level system resources.

4. The system of claim 1, wherein the application program interface is applied within a voice user interface development system that includes a tool utilized by a developer to selectively configure the first and second dialog containers so as to selectively configure the user's experience with said corresponding implementation of the voice user interface.

5. The system of claim 1, wherein the first container is contained within the second dialog container.

6. The system of claim 1, wherein the particular audible dialog element is a QuestionAnswer element.

7. The system of claim 1, wherein the different property setting requirements are a difference in whether or not post-processing properties are required.

8. A computer-implemented method for enabling a developer of a voice user interface to mix different types of audible dialog prompts within the voice user interface, the method comprising:

providing, within a development framework utilized by the developer to selectively configure audible dialog prompts within the voice user interface, a first dialog container that includes instructions that are executed by a computer processor that is a component of a computing device so as to activate, in a predetermined sequence, audible dialog prompts that correspond to a collection of audible dialog elements assigned to the first dialog container, the predetermined sequence being at least partially determined by semantics-driven audible dialog logic embedded within the first dialog container so as to delegate functions to dialog elements assigned to the first dialog container; and providing, within the development framework, a second dialog container that includes instructions that are executed by the computer processor so as to activate, in a predetermined order, audible dialog prompts that correspond to a collection of audible dialog elements assigned to the second dialog container, the predetermined order being at least partially determined by state-driven audible dialog logic embedded within the second dialog container so as to delegate functions to dialog elements assigned to the second dialog container.

9. The method of claim 8 further comprising, in response to an input received from the developer, providing a statement element that is outside of the first and second containers, wherein the statement element includes an instruction to output an audible prompt to which no user response is expected.

10. The method of claim 8 further comprising providing at least one particular audible dialog element that initiates the same audible dialog prompt regardless of whether assigned to either of the first or second dialog containers.

11. The method of claim 8 further comprising configuring the first and second dialog containers such that an instance of the first dialog container is operable from within an instance of the second dialog container or vice verse.

12. The method of claim 8, wherein the collection of audible dialog elements assigned to the first dialog container includes an audible dialog element that is a FormFillingDialog element, wherein the FormFillingDialog element includes computer readable instructions that, when executed by the computer processor, facilitate a semantic-driven audible dialog with a user through the voice user interface, wherein the semantic-driven dialog includes audible dialog prompts provided to the user in a manner that prompts the user through a process of filling in fields within a form.

13. The method of claim 8, wherein the collection of audible dialog elements assigned to the first dialog container includes an audible dialog element that is a record sound element that facilitates a process of recording a sound received from a user that interacts with the voice user interface.

14. The method of claim 8, further comprising connecting the first and second dialog containers to a core API framework that serves as an interface to low-level system resources.

15. An audible dialog development system for enabling a developer to mix different types of audible dialog prompts within an application that includes a voice user interface, the system comprising:

a first dialog container that contains instructions to activate, in a predetermined sequence, audible dialog prompts that correspond to a collection of audible dialog elements assigned to the first dialog container, the predetermined sequence being at least partially determined by a semantics-driven audible dialog logic applied by the first dialog container to said collection of audible dialog elements assigned to the first dialog container;

a second dialog container that contains instructions to activate, in a predetermined sequence, audible dialog prompts that correspond to a collection of audible dialog elements within the second dialog container, the predetermined sequence being at least partially determined by state-driven audible dialog logic applied by the second dialog container to said collection of audible dialog elements within the second dialog container;

wherein the semantics-driven audible dialog logic is embedded within the first container such that it does not vary depending upon which dialog elements are included in the collection of audible dialog elements assigned to the first container;

wherein the state-driven audible dialog logic is embedded within the second container such that it does not vary depending upon which dialog elements are included in the collection of audible dialog elements assigned to the second container; and a computer processor that is a component of a computing device, wherein the computer processes said instructions contained in the first and second dialog containers so as to provide a corresponding implementation of the voice user interface outputting, to a user of said application, said audible dialog prompts that correspond to the collection of audible dialog elements assigned to the first dialog container and said audible dialog prompts that correspond to the collection of audible dialog elements assigned to the second dialog container.

16. The dialog system of claim 15, wherein the second dialog container is contained within the first dialog container.

17. The dialog system of claim 15, wherein the predetermined sequence is at least partially based on selective adjustment by the developer of the audible dialog elements contained within the first and second dialog containers.

18. The dialog system of claim 15, wherein the system further comprises a tool utilized by the developer to selectively configure the first and second dialog containers so as to selectively configure a user's experience with the voice user interface.

* * * * *